(12) United States Patent
Liu et al.

(10) Patent No.: US 7,894,689 B2
(45) Date of Patent: Feb. 22, 2011

(54) IMAGE STITCHING

(75) Inventors: Che-Bin Liu, Milpitas, CA (US); Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 936 days.

(21) Appl. No.: 11/756,517

(22) Filed: May 31, 2007

(65) Prior Publication Data

US 2008/0298718 A1    Dec. 4, 2008

(51) Int. Cl.
*G06K 9/36* (2006.01)
(52) U.S. Cl. ..................................... 382/284
(58) Field of Classification Search ................ 382/284, 382/282, 291, 299, 173, 176, 177; 358/453, 358/462, 464, 465
See application file for complete search history.

(56) References Cited

U.S. PATENT DOCUMENTS

| | | | |
|---|---|---|---|
| 5,555,556 A | 9/1996 | Ozaki | |
| 5,790,114 A | 8/1998 | Geaghan et al. | |
| 5,802,203 A | 9/1998 | Black et al. | |
| 5,956,468 A | 9/1999 | Ancin | |
| 6,097,849 A | 8/2000 | Nevis | |
| 6,227,725 B1 | 5/2001 | Ancin et al. | |
| 6,275,304 B1 | 8/2001 | Eschbach et al. | |
| 6,621,595 B1 | 9/2003 | Fan et al. | |
| 6,633,670 B1 | 10/2003 | Matthews | |
| 6,641,053 B1 | 11/2003 | Breidenbach et al. | |
| 6,701,010 B1 | 3/2004 | Katsuyama | |
| 6,701,012 B1 | 3/2004 | Matthews | |
| 6,701,020 B2 | 3/2004 | Chrysafis et al. | |
| 6,728,005 B1 | 4/2004 | Jia et al. | |
| 6,731,814 B2 | 5/2004 | Zeck et al. | |
| 6,771,816 B1 | 8/2004 | Gaither | |
| 6,802,611 B2 | 10/2004 | Chu et al. | |
| 6,879,733 B2 | 4/2005 | Shu et al. | |
| 6,879,734 B2 | 4/2005 | Chen et al. | |
| 6,895,106 B2 | 5/2005 | Wang et al. | |
| 6,941,011 B2 | 9/2005 | Roylance et al. | |
| 6,941,024 B2 | 9/2005 | Mukherjee | |
| 7,095,905 B1 | 8/2006 | Peterson | |
| 7,119,816 B2 | 10/2006 | Zhang et al. | |
| 7,171,056 B2 | 1/2007 | Zhang et al. | |
| 2001/0000314 A1 | 4/2001 | Queiroz et al. | |
| 2001/0000711 A1 | 5/2001 | Queiroz et al. | |
| 2001/0031092 A1 | 10/2001 | Zeck et al. | |
| 2002/0168105 A1 | 11/2002 | Li | |
| 2003/0031377 A1 | 2/2003 | Ahn | |
| 2003/0048954 A1 | 3/2003 | Matthews | |
| 2003/0072487 A1 | 4/2003 | Fan et al. | |
| 2003/0077561 A1 | 4/2003 | Alsop et al. | |

(Continued)

*Primary Examiner*—Yon Couso

(57) ABSTRACT

Disclosed are embodiments of systems and methods to stitch two or more images together into a composite image. By finding matching point pairs for a pair of images, a homography transform may be obtained for the pair of images. The homography transform may be used to generate a composite image of the image pair. In an embodiment, the process of identifying a homography transform may be iterated. In an embodiment, when forming the composite image, the transformed foreground regions may be selected such that there is no intersection of foreground pixel regions. In an embodiment, foreground pixel regions on the border of an image may be removed. The resulting composite image is a larger image generated from the selected regions from the input images. In embodiments, the process may be repeated for sets of images with more than two images.

20 Claims, 14 Drawing Sheets

U.S. PATENT DOCUMENTS

| | | |
|---|---|---|
| 2003/0156118 A1 | 8/2003 | Ayinde |
| 2004/0017579 A1 | 1/2004 | Lim |
| 2004/0027618 A1 | 2/2004 | Nakamura et al. |
| 2004/0042680 A1 | 3/2004 | Saund |
| 2004/0153461 A1 | 8/2004 | Brown et al. |
| 2004/0165786 A1 | 8/2004 | Zhang et al. |
| 2004/0174546 A1 | 9/2004 | Guleryuz |
| 2004/0175037 A1 | 9/2004 | Guleryuz |
| 2004/0227758 A1 | 11/2004 | Curry et al. |
| 2005/0175249 A1 | 8/2005 | Ferlitsch |
| 2005/0244065 A1 | 11/2005 | Malvar et al. |
| 2005/0281474 A1 | 12/2005 | Huang |
| 2006/0050152 A1 | 3/2006 | Rai et al. |
| 2007/0031063 A1 | 2/2007 | Zhou |

IMAGE STITCHING

BACKGROUND

A. Technical Field

The present invention pertains generally to image processing, and relates more particularly to image processing that stitches a plurality of images into a composite image. The present invention may be incorporated into systems and methods.

B. Background of the Invention

When capturing a scene that is particularly large or when using a camera with a limited field of view, it is not always possible to capture the entire scene within a single image frame. For example, the content on a large whiteboard may cover too large of an area to capture in a single image. Or, copying a document using a camera with a limited field of view, such as a camera phone, may require taking multiple images.

When multiple images are taken, it may be beneficial to have the images as a single image. To join the content from multiple input images, the multiple images must be properly pieced or stitched together. It is therefore an object of the present disclosure to provide systems and methods for generating a composite image from a plurality of images.

SUMMARY OF THE INVENTION

Aspects of the present invention provide systems and methods for generating a composite image from a plurality of images.

In an embodiment, foreground image information may be extracted and stored as black and white images. In one embodiment, foreground information may be extracted using image segmentation.

Interest points may be extracted from the binary images. In an embodiment, interest-point feature extraction may be obtained using a multi-resolution interest-point detector. Examples of interest point detectors that may be used include, but are not limited to, scale invariant feature transform (SIFT) and Harris corner detector. In an embodiment, image points within a border region from an image border may be excluded.

In an embodiment, having obtained a set of interest points, point matching may be performed between images. In an embodiment, the best-matched point pairs may be found using interest-point features from the images.

In an embodiment, having obtained a set of point pairs, a set of dominant point pairs may be identified. In one embodiment, a distance histogram may be used for identifying a set of dominant point pairs.

In an embodiment, the selected point pairs may be used to compute a transform for stitching the images together. In one embodiment, the transform may be iteratively obtained by parsing point pairs that have a distance error greater than a distance error threshold value.

In an embodiment, the process of obtaining a transform may be obtained by using two or more passes. For example, an initial transform may be obtained to identify an approximate overlap region between images. Regions from the approximate overlap region may be used to generate a subsequent transform. In an embodiment, this process may be repeated. Such methods help improve both the accuracy and processing speed for developing a transform between images.

In an embodiment, an intersection test may be performed to determine if any foreground pixels should be pruned or discarded from one image because they appear in the other image.

In an embodiment, the resultant images may be formed into a composite image using the transform. In an embodiment, the foreground pixels of one image may be directly transformed into the composite image. Alternatively, a bounding box for a foreground pixel group of one image may be transformed. Pixel locations within the transformed bounding box may be inverse transformed and the pixel value in the composite image may be set to the value at the inverse-transformed pixel location.

In an embodiment, the composite image may be supplied as part of the set of input images and the process may be repeated until a single composite image is obtained. One skilled in the art shall recognize that some steps, such as segmentation, may not need to be performed for a composite image, and other such images, as it is already in a segmented form.

Aspects of the present invention may be incorporated or included in a system or systems. It should be noted that the teachings of the present invention may be implemented in any device or system that is capable of receiving, and processing a digital image, included but not limited to computers, multimedia devices, scanners, printers, copiers, cameras, facsimile machine, and the like.

Aspects of the present invention may be implemented in a wide variety of ways including software, hardware, firmware, or combinations thereof. For example, the functions to practice various aspects of the present invention may be performed by components that are implemented in a wide variety of ways, including discrete logic components, one or more application specific integrated circuits (ASICs), and/or a program or programs of instructions for execution by one or more program-controlled processors. It shall be noted that the manner in which the present invention is implemented is not critical.

In an embodiment, an image stitching system may comprises a segmenter, an interest point detector, a point matcher, a point pair selector, a transform calculator, a border pixel remover, an intersection checker, and an image stitcher. in an embodiment, the segmenter may identify one or more foreground pixel groups in a first image from the set of images and one or more foreground pixel groups in a second image from the set of images; the interest point detector may identify a set of interest points selected from the foreground pixel groups in the first image; the point matcher may form a set of point pairs by finding a set of points selected from the foreground pixel groups of the second image that correlates to the set of interest points; the point pair selector may use a distance histogram to select a set of dominant point pairs; the transform calculator may form a transform using at least some of the set of dominant point pairs; the border pixel remover may, responsive to a foreground pixel group residing on a boundary of the first image or the second image, remove the foreground pixel group; the intersection checker may, responsive to at least one foreground pixel of a transformed foreground pixel group from the second image, which transformed foreground pixel group is obtained using the transform, corresponding at a same pixel location in the first image to a foreground pixel in the first image, discard the foreground pixel group of the second image; and the image stitcher may use the transform and at least some of the non-discarded foreground pixel groups to form a composite image.

Some features and advantages of the invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

Figure ("FIG.") 1 depicts a method for stitching a plurality of images into a composite image according to an embodiment of the invention.

DETAILED DESCRIPTION OF THE PREFERRED EMBODIMENTS

Figure 1:
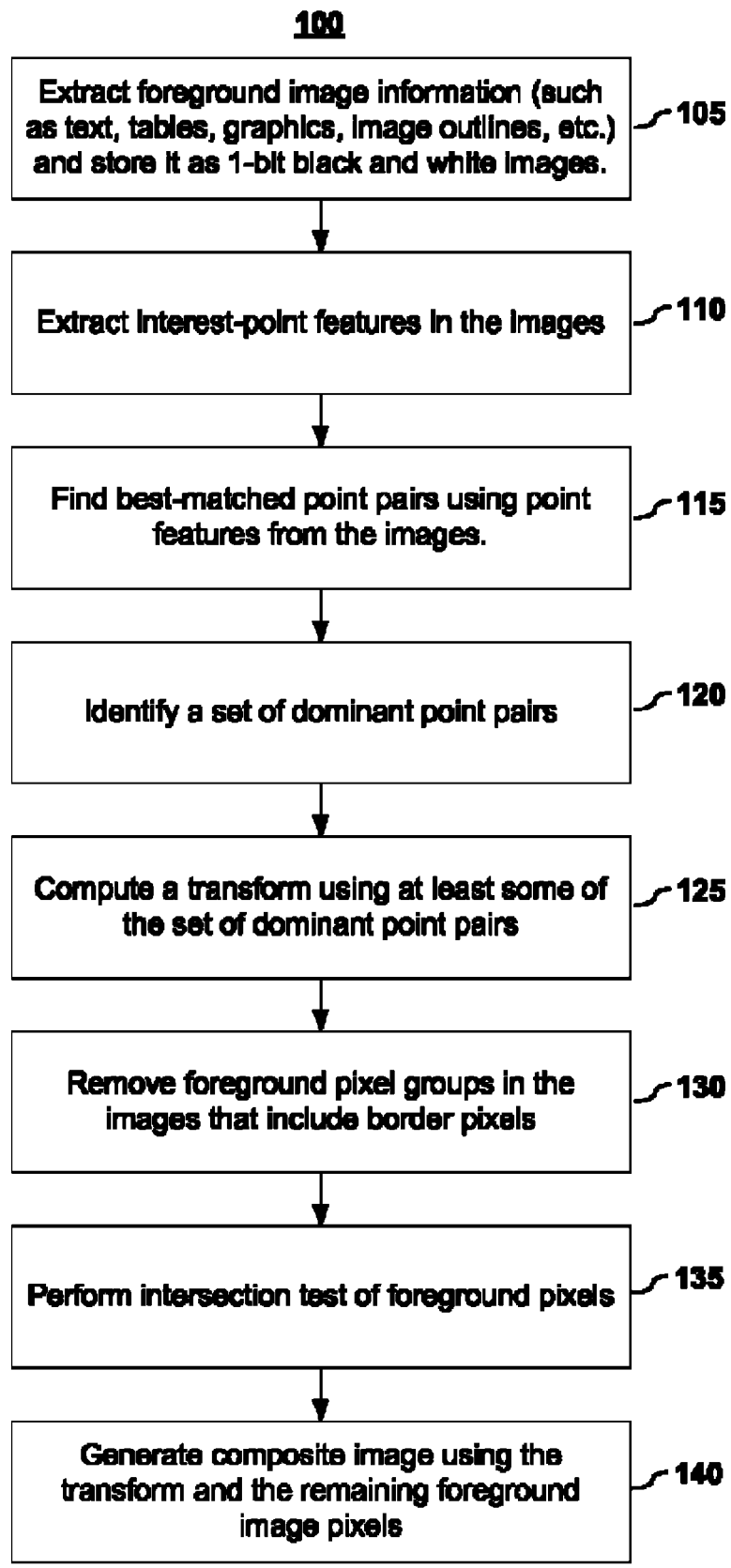

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different systems and devices including camera, scanners, printers, computers, facsimile machine, mobile devices, including those devices with a display or camera capabilities, multimedia devices, and the like. The embodiments of the present invention may be implemented in software, hardware, firmware, or combinations thereof. Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that the various components, or portions thereof, may be divided into separate components or may be integrated together, including integrating within a single system or component.

Furthermore, connections between components/modules within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment" or "an embodiment" means that a particular feature, structure, characteristic, or function described in connection with the embodiment is included in at least one embodiment of the invention and may be in more than one embodiment. The appearances of the phrase "in one embodiment" or "in an embodiment" in various places in the specification are not necessarily all referring to the same embodiment.

Presented herein are systems and methods to stitch multiple images into a composite image that represents the original images. The present approaches differ from other attempts that produce large images from a set of small images, such as mosaic images or panorama images. Mosaic images or panoramic images typically employ blending to join images, which may not be acceptable in cases where close alignment of images is critical, such as, for example, where the images contain text. The present approaches also vary because many other approaches require manual selection of corresponding points in image pairs. Even with some automatically-selected corresponding point approaches, post-processing, such as image blending, is required to alleviate obvious image boundaries after image transformation. The present approaches do not require post-processing of the composite image.

A. Method for Stitching a Plurality of Images into a Composite Image

FIG. 1 depicts an embodiment of a method 100 for stitching a plurality of images into a composite image according to an embodiment of the invention. In an embodiment, stitching images may be considered as two main processes. The first process involves extracting important information from the input images (such as text, tables, graphics, image outlines, etc.) and storing that information as black and white images. The second process involves taking two or more black and white images and stitching them into one composite image. In the embodiment depicted in FIG. 1, step 105 addresses the first process and the remaining steps (110-140) address the process of stitching the images into a composite image.

1. Extracting Foreground Image Information

In an embodiment, extracting (105) foreground image information and storing (105) it as 1-bit black and white images may be performed by segmenting an image into foreground segments and forming a binary foreground image. A digital image typically comprises an array of picture elements. Each picture element, also known as a "pixel," has a value and a location within the array. The value represents either the intensity of the pixel (if in grayscale only) or the intensity and color of the pixel. At a higher level, an image may be considered to be comprised of groups or classes of pixels. For example, pixels of an image may be classified or segmented into foreground and background groups or segments. In embodiments, segmentation may be performed according to one or more of the methods disclosed in U.S. patent application Ser. No. 11/202,720, filed Aug. 12, 2005, entitled "Label Aided Copy Enhancement," listing Anoop K. Bhattacharjya as inventor; U.S. patent application Ser. No. 11/691,339, filed Mar. 26, 2007, entitled "Systems and Methods for Generating Background and Foreground Images for Document Compression," listing Che-Bin Liu and Anoop Bhattacharjya as the inventors; and U.S. patent application Ser. No. 11/691,418, filed Mar. 26, 2007, entitled "Systems and Methods to Convert Images into High-Quality Compressed Documents," listing Che-Bin Liu and Anoop Bhattacharjya as the inventors, each of which is incorporated in its entirety herein by reference. One skilled in the art shall recognize other segmentation methods may also be employed. It shall be noted that no particular segmentation method is critical to the present invention. It shall also be noted that although the discussion presented herein discusses using foreground pixels, it shall be understood that the present invention may be applied to other pixel classes. Accordingly, references herein to "foreground" shall be understood to be a class of pixels and not limited to strictly pixels in a foreground of the image.

Figure 2:
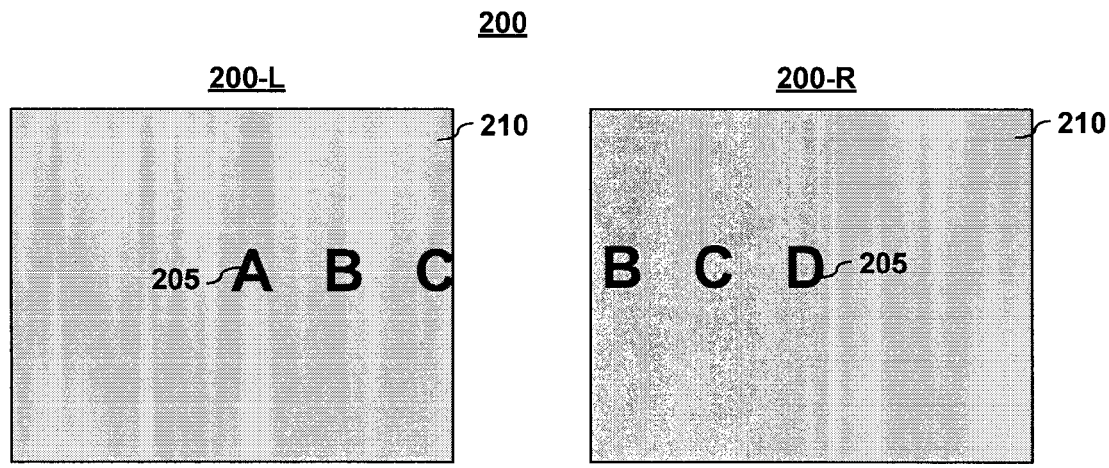
FIG. 2 depicts an example of a plurality of input images according to an embodiment of the invention.

FIG. 2 depicts an example of a plurality of input images 200 according to an embodiment of the invention. In the depicted example, the plurality of input images comprises two input images, 200-L and 200-R. In embodiments, it is assumed that the two input images have an overlap region. In an embodiment, this overlap region is preferably 10% to 30% in either dimension—less overlap tends to decrease alignment accuracy, and large overlap results in computation overhead.

For purposes of illustration, the present invention will demonstrate image stitching using an example with two input images; however, it shall be noted that the present invention may be applied to any number of input images. For example, in an embodiment, if there are N input images, the image stitching process disclosed herein may be repeated N−1 times.

Each input image 200 comprises background pixels 210 and foreground pixels 205. Although the foreground content may be on a clean background (such as on either whiteboards or paper documents), captured images usually contain unwanted background colors due to environment lighting conditions. Alternatively, the background may initially contain background color or colors, such as an image of a document on colored paper. Post-processing of the captured images using image editing software is a typically very tedious, and it is very difficult to achieve satisfactory quality. However, segmentation may be used to extract (105) the foreground information from the background. In an embodiment, the foreground pixels may be formed into foreground pixels groups using connected component analysis. One skilled in the art shall recognize that forming the foreground pixels into groups may be performed as part of or as a result of the segmentation.

Figure 3:
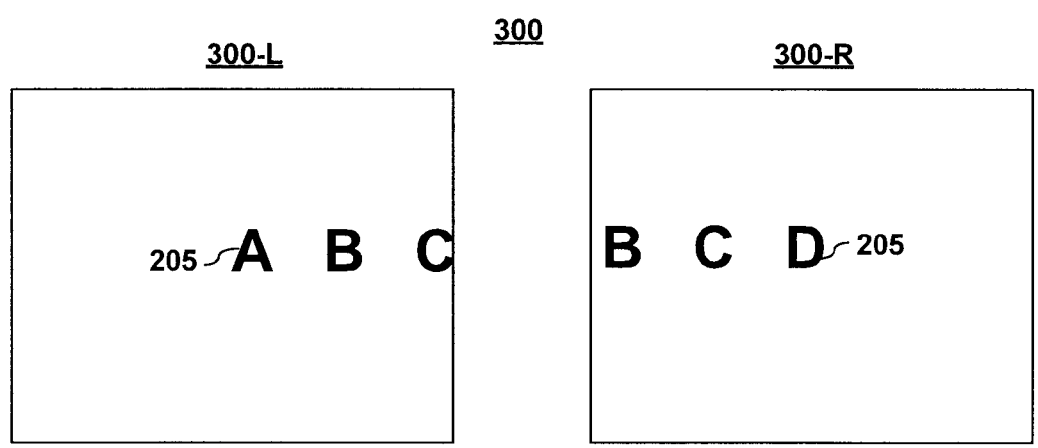
FIG. 3 depicts an example of a plurality of input images after the foreground information has been extracted and stored in a binary image according to an embodiment of the invention.

FIG. 3 depicts an example of a plurality of input images 300 after the foreground information has been extracted and stored in a binary image according to an embodiment of the invention. Note that in the black and white images 300 the foreground information 205 is preserved from the initial plurality of input images 200. In an embodiment, each of the letters of the foreground groups (A, B, C, and D) may represent separate connected component groups.

2. Extracting Interest-Point Features

Returning to the embodiment depicted in FIG. 1, interest points may be extracted (110) from the binary images 300. In an embodiment, interest-point feature extraction from the left image 300-L and the right image 300-R may be obtained using a multi-resolution interest-point detector. Examples of interest point detectors that may be used include, but are not limited to, scale invariant feature transform (SIFT) and Harris corner detector. In an embodiment, image points within a border region from an image border may be excluded. Excluding pixels at or near the image border may be beneficial because such pixels have limited neighborhood information, which typically affects the interest point detection analysis.

3. Finding Matching Point Pairs

Having obtained a set of interest points, point matching may be performed between the images. In an embodiment, the best-matched point pairs may be found (115) using point features from both images. One skilled in the art shall recognize that the feature information of an interest point may form a vector for that interest point, and points may be matched (115) by comparing the vector information. In an embodiment, point pairs may be found by identifying a point in one image with a vector that is closest to the vector of a point in the other image. In one embodiment, the closeness of the vectors may be measured using Euclidean "distance" calculations, which method is well known to those skilled in the art.

4. Identifying Dominant Point Pairs

Figure 4:
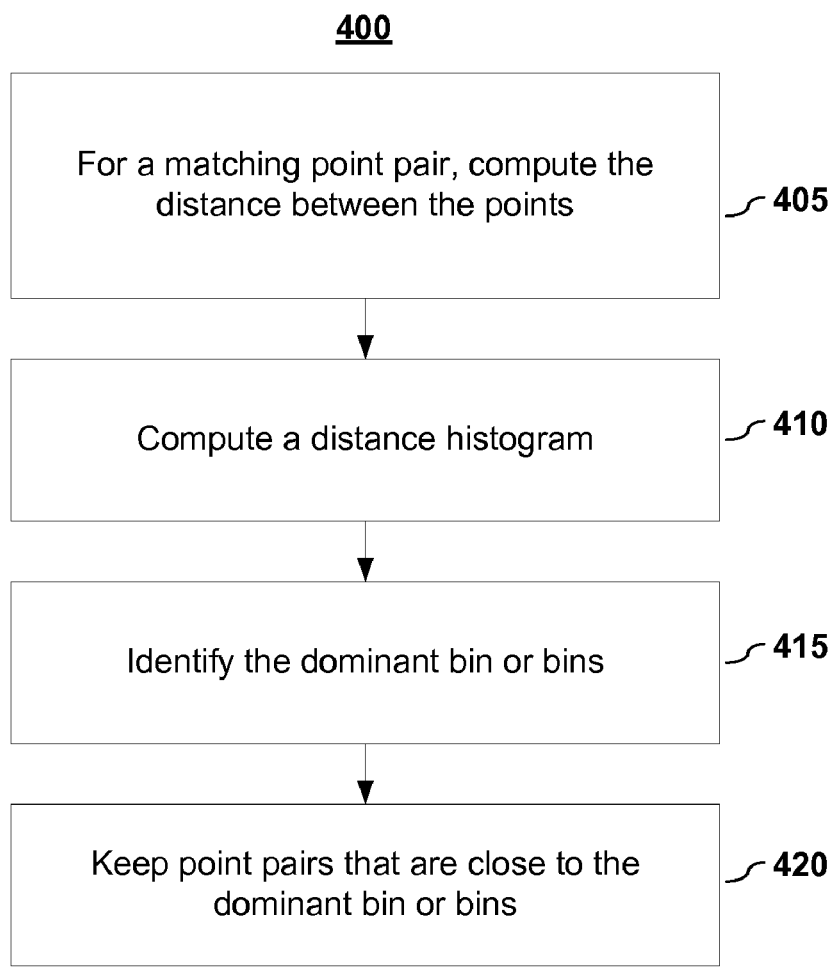
FIG. 4 depicts a method for histogram-based pruning according to an embodiment of the invention.

Having obtained a set of point pairs, a set of dominant point pairs may be identified (120). FIG. 4 depicts an example of a method 400 for identifying a set of dominant point pairs according to an embodiment of the invention.

Figure 5:
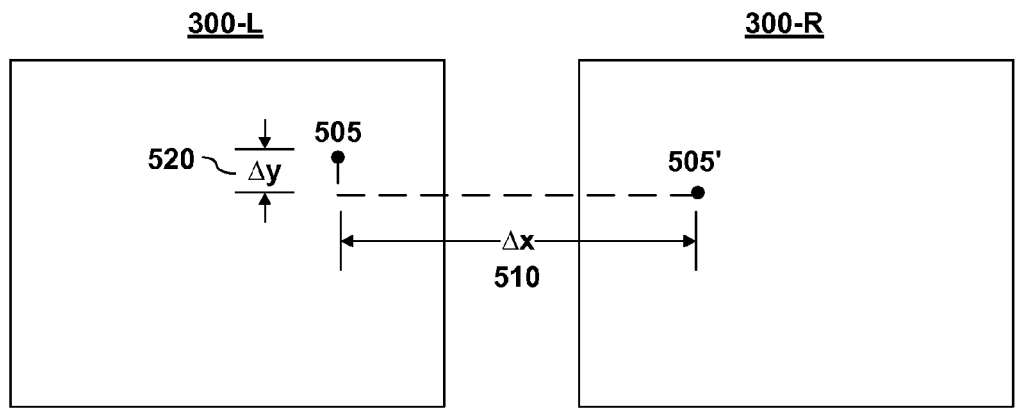
FIG. 5 depicts an example of distance measurements between a matched point pair according to an embodiment of the invention.

In an embodiment, given a set of point pairs, the distance between the point pairs may be calculated (405). FIG. 5 depicts an example of a method for calculating distance measurements between a matched point pair 505-505' according to an embodiment of the invention. As illustrated in FIG. 5, the difference in the x-direction 510 and the difference in the y-direction 520 between a point 505 in one image 300-L and its matching point 505' in the other image may be calculated by subtracting the coordinate points of the pair 505-505'. For example, $\Delta x$ may be defined as $x_r - x_1$ and $\Delta y$ may be defined as $y_r - y_1$, where $(x_1, y_1)$ and $(x_r, y_r)$ are the coordinates of the points in the left and right images, respectively.

Figure 6:
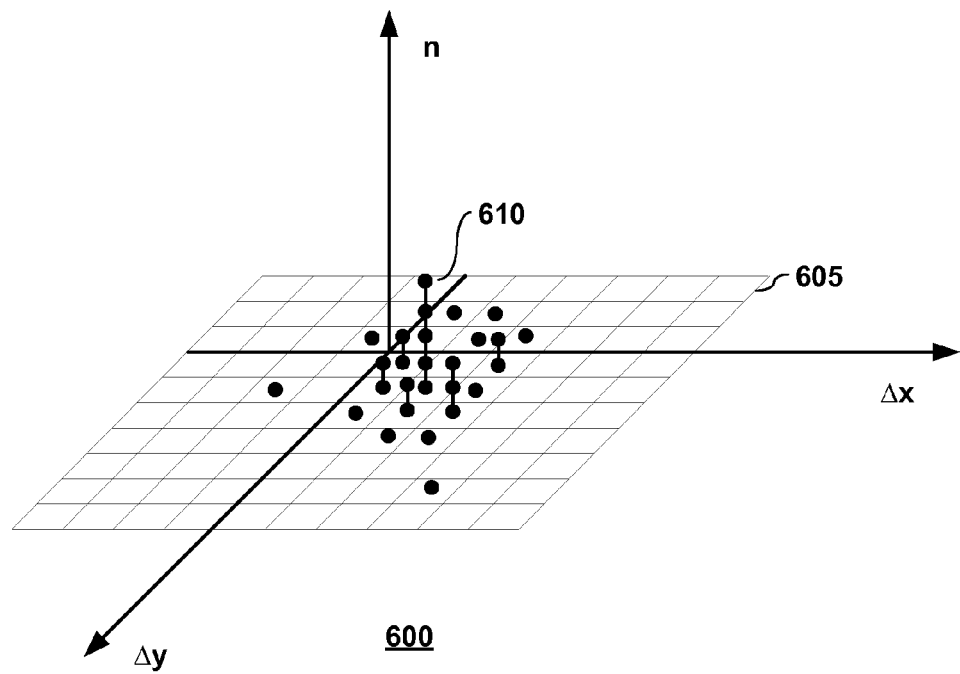
FIG. 6 depicts an example of a distance histogram according to an embodiment of the invention.

Return to FIG. 4, having obtained distance information for each point pair, a distance histogram may be computed (410). In an embodiment, a distance histogram may be computed using both the x- and y-direction information. FIG. 6 depicts an example of a distance histogram 600 according to an embodiment of the invention. As illustrated in FIG. 6, a 10-by-10 bin histogram has been formed. In an embodiment, the size of a bin 605 may be determined by taking the difference between the maximum and the minimum distance values in a direction and dividing it by the number of desired bins (e.g., $[\Delta x_{max}-\Delta x_{min}]/10$ and $[\Delta y_{max}-\Delta y_{min}]/10$), although it shall be noted that the number of bins is not critical to the present invention. The distance information for each of the point pairs may be used to form the histogram, wherein each dot on the histogram represents a point pair with a distance ($\Delta x$, $\Delta y$) that falls within that bin.

Using the histogram, a dominant bin or bins may be identified (415). In an embodiment, the dominant bin may be identified as the bin with the most point pairs. For example, as illustrated in FIG. 6, bin 610 has the most occurrences and may be identified as the dominant bin. One skilled in the art shall recognize that any approach for determining a peak may be used, including, but not limited to smoothing the data to identify a peak.

As depicted in the embodiment shown in FIG. 4, with a dominant bin or bins identified, point pairs that are close to the dominant bin or bins may be kept (420) and the remaining point pairs may be discarded. Point pairs may be selected by identifying point pairs by their bin location, using mean and standard deviation information, by selecting the top m point pairs, and/or by discarding the bottom n point pairs. One skilled in the art shall recognize that there are a number of methods for selecting or pruning data points, which may be applied herein.

5. Computing a Transform

Figure 7:
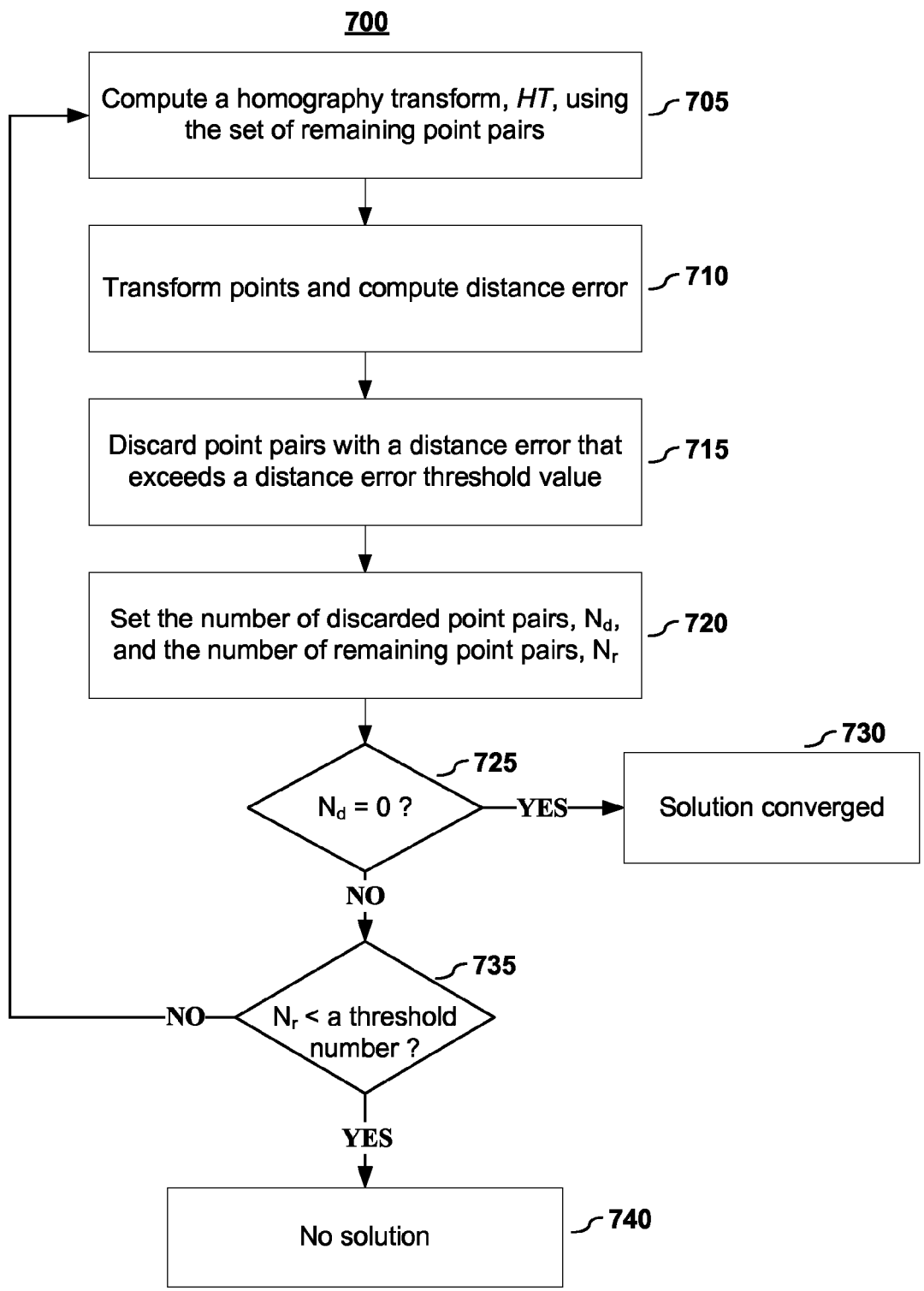
FIG. 7 depicts a method for computing a transform according to an embodiment of the invention.

Returning to FIG. 1, the selected point pairs may be used to compute a transform (125) for stitching the images together. FIG. 7 depicts a method for computing a transform according to an embodiment of the invention.

In an embodiment, a homography transform, HT, may be computed (705) using the set of remaining point pairs. Using the transform, the points from one image may be transformed (710). The distance error, $d_{err}$, between the transformed point and the matching point of the point pair may be computed (710). In an embodiment, point pairs with a distance error that exceeds a distance error threshold value may be discarded (715). And, the number of discarded point pairs, $N_d$, and the number of remaining point pairs, $N_r$, may be noted (720). If no point pairs were discarded (725), i.e., $N_d=0$, which means that all point pairs were transformed with a distance error less than the distance error threshold value, the homography transform may be considered to have converged (730).

If, however, the number of point pairs that were discarded is a non-zero number (i.e., $N_d>0$), then the process may be repeated. In the depicted embodiment, a check may be performed (735) to determine whether a sufficient number of point pairs remain before iterating the processes. If a sufficient number of point pairs remain, the process may repeat by computing (705) a new homography transform using the reduced set of point pairs.

If the number of remaining point pairs does not exceed a threshold number, the process may be halted (740). It may be beneficial to require that the transform converge with a minimum number of point pairs to better insure a robust solution is obtained.

There are cases in which a solution may not be obtained, and it may be beneficial to be alerted to such instances. For example, in the depicted example set of images 200, the relative position between the images is known. If the relative position between two images is not known, aspects of the present invention may be applied multiple times at varying orientations until a satisfactory match alignment is obtained. Thus, in an embodiment, if the point pairs do not result in a convergent solution, it may be an indicator that the orientation is incorrect and that it may be beneficial to repeat the process assuming a different orientation. In an embodiment, steps 110-125 of FIG. 1 may be performed multiple times (for example, up to four times for the four possible relative positions—up, down, left, and right) and the transform with the least error may be used.

In an embodiment, a method to determine the relative position of two images may involve checking the population of foreground pixels around image borders. If there are very few foreground pixels around one side of the image border, it is unlikely to be an overlap region because overlap should possess at least some of the same portion of a scene (such as a portion of the same text, table, graphics, image, etc.).

6. Alternative Embodiment

Figure 8:
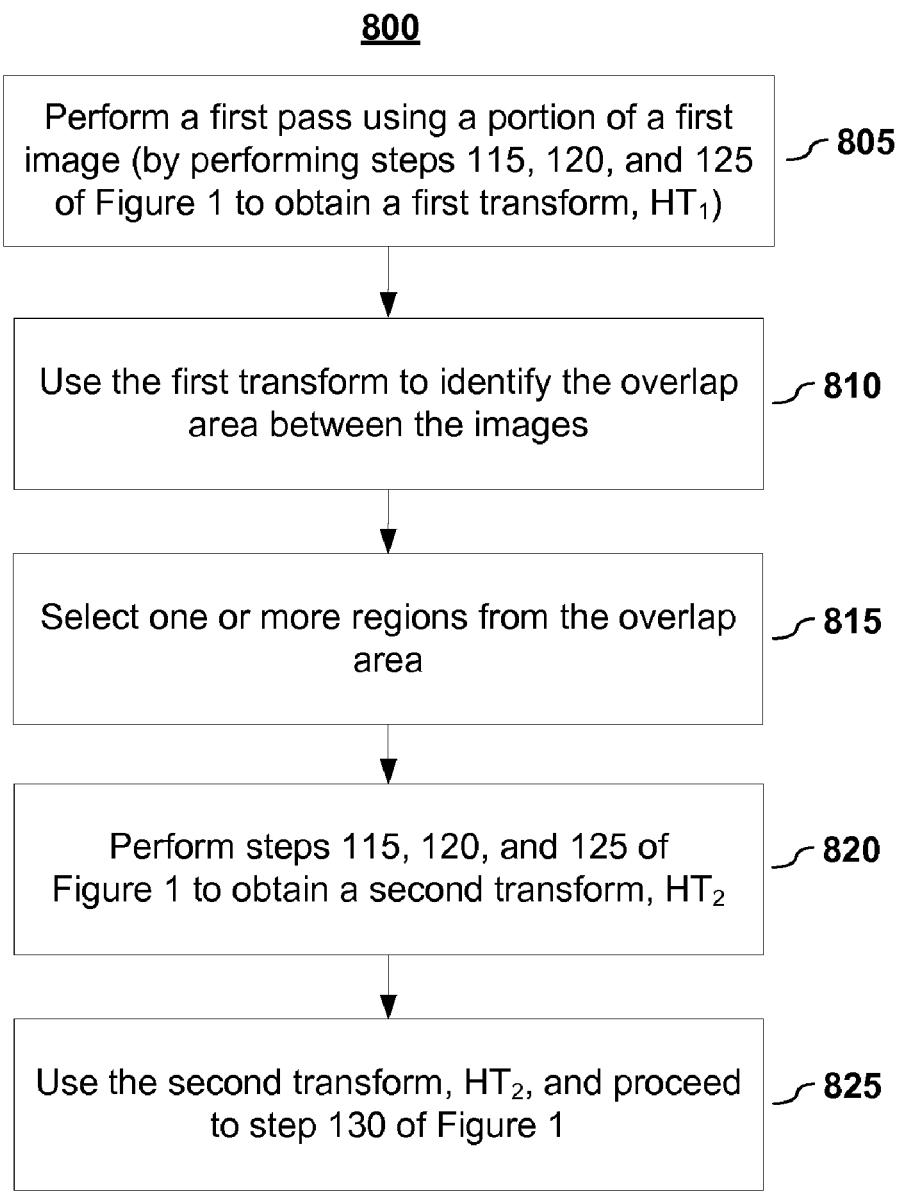
FIG. 8 depicts a method to generate a transform using multiple passes according to an embodiment of the invention.

FIG. 8 depicts an alternative method 800 to generate a transform using multiple passes according to an embodiment of the invention. The method depicted in FIG. 8 helps improve both the accuracy and processing speed for developing a transform between images. Accurate point matching methods for dense points (e.g., images) generally take a long time to process, and they also typically require a large amount of memory for computation. When the given images are large and contain significantly large overlapping area, typical computers or computer devices, such as personal computer (PCs) or Mac computers sold by Apple, Inc. of Cupertino, Calif., may not have sufficient resources, such as memory, to complete such computations.

Using only part of the overlapping area may allow such devices and other devices with limited resources to handle the computation. In the embodiment disclosed with reference to FIG. 8, there is not an attempt to try to match all points in the images. Instead, a small area of one image may be matched (805) against some or all of another image in a first pass.

Figure 9A:
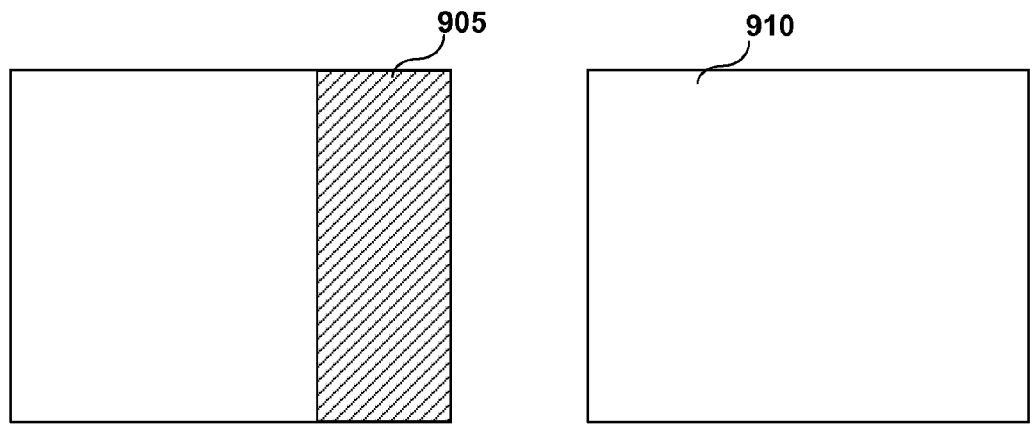
FIGS. 9A-9C illustrates examples of approaches to identifying image area overlaps according to embodiments of the invention.
Figure 9B:
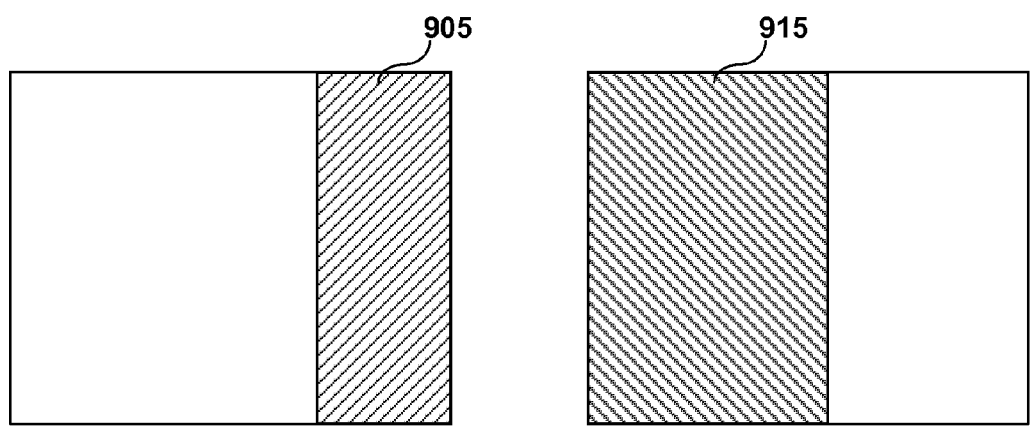
Figure 9C:
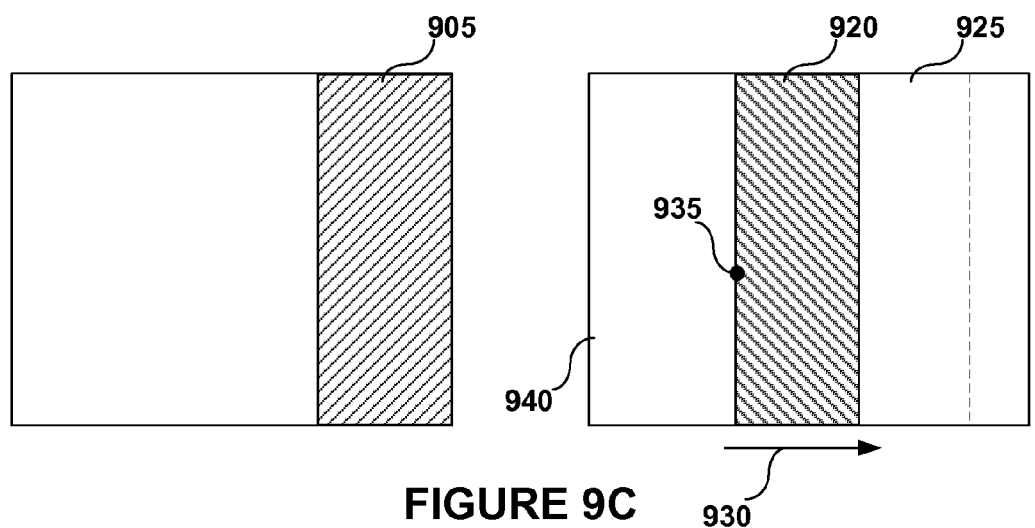

FIG. 9A-9C illustrates examples of approaches to identifying image area overlaps according to embodiments of the invention. FIG. 9A depicts a portion 905 of the left-hand image being matched against the right-hand image 910. FIG. 9B depicts a portion 905 of the left-hand image being matched against a large portion of the right-hand image 915. FIG. 9C depicts a portion 905 of the left-hand image being matched against a portion of the right-hand image 920, wherein if no transform solution converges, subsequent portion or portions (e.g., portion 925) may be systematically tried as indicated by the arrow 930. In an embodiment, border regions of the portions may be removed when trying to identify interest-point features. Alternatively, no border portions may be removed, particularly in the cases where points reside on border areas that have image information that may be used to generate interest-point feature information. For example, point 935 may be included in the process particularly if the image information in region 940 may be used to help generate the interest-point features for point 935.

In an embodiment, in this initial pass, interest points are extracted, dominant matches are identified, and an initial transform is computed (805). Although this initial pass may not be extremely accurate, the transform may be used (810) to identify an approximate overlap between the images. Given an approximate overlap area, matching may be more selectively performed by trying to find matches within some or all of the approximate overlap region.

Figure 10A:
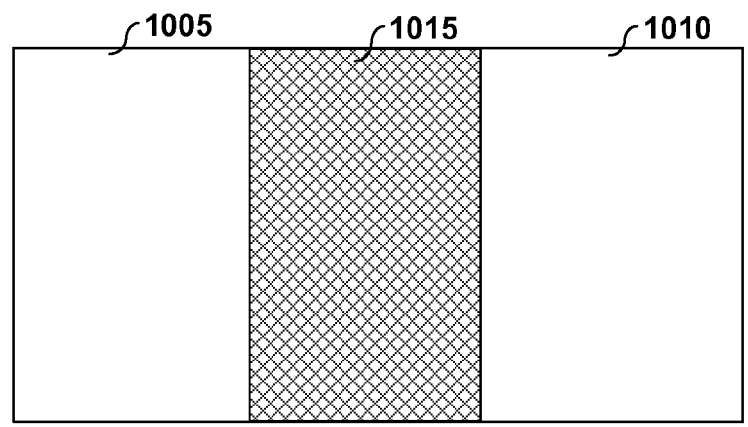
FIG. 10A illustrates an example of an initial area of overlap according to an embodiment of the invention.
Figure 10B:
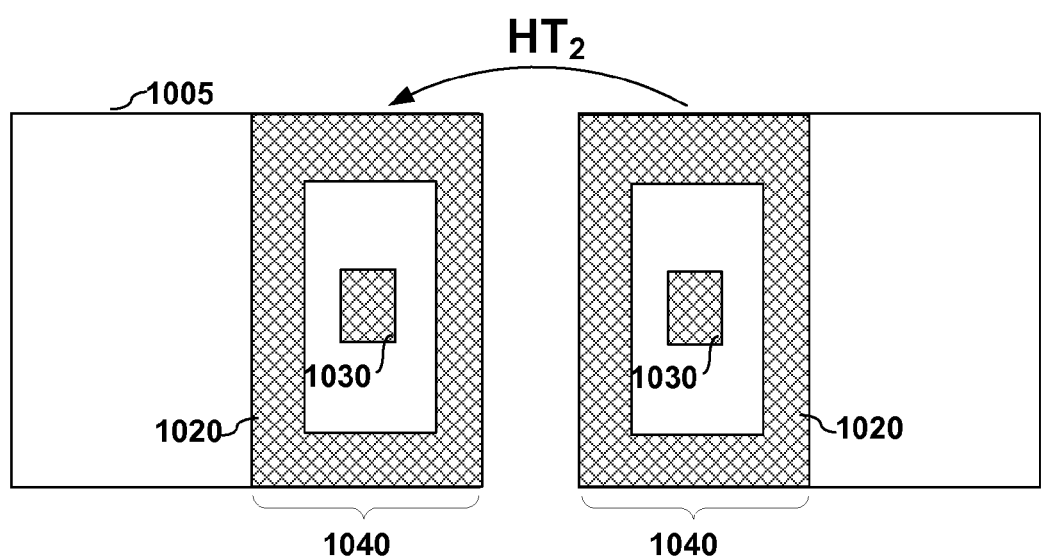
FIG. 10B illustrates an example of a region within the overlap region that may be used to find matching point pairs from which a transform may be developed according to an embodiment of the invention.

For example, FIG. 10A illustrates an example of an initial area of overlap 1015 between two images 1005 and 1010 according to an embodiment of the invention. One or more regions may be selected (815) within each of the images. FIG. 10B illustrates an example of regions 1020, 1030 within the overlap region 1015 that may be used to find matching point pairs from which a transform may be developed according to an embodiment of the invention. It shall be noted that differently shaped regions and different numbers of regions may be used. In an embodiment, the selected region or regions may be representative regions of the overlap area. The union of the regions 1020, 1030 form a new region 1040 from which interest points may be extracted, dominant matches may be identified, and a second transform, $HT_2$, may be computed (820). Such an approach saves processing time because full image matching is not performed, and more accurate transform may be obtained by performing image matching in strategically selected area. The second transform may then be used (825) in the remainder of the method depicted in FIG. 1.

Although a two-pass iteration is typically sufficient to obtain satisfying results, in embodiments, more accurate results may be obtained by extending this approach to multiple-passes, which iterate the process of obtaining image transforms and matching points within representative image regions.

7. Removing Foreground Regions that Include Border Pixels

Figure 11:
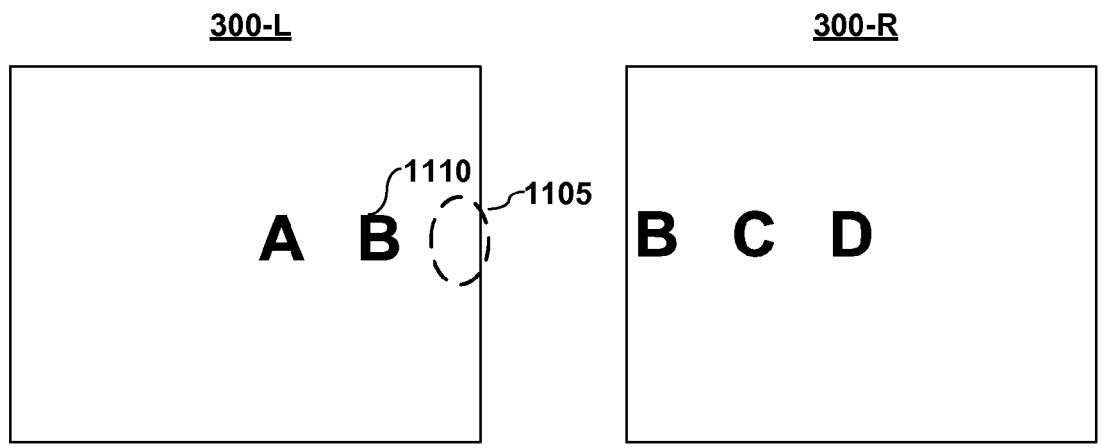
FIG. 11 illustrates removal of foreground pixel regions that include border pixels according to an embodiment of the invention.

Returning to FIG. 1, in an embodiment, foreground pixels groups in the images that include pixels at the border of the image may be removed (130) from the image. FIG. 11 illustrates the removal 1105 of the foreground pixel group "C" from image 300-L because it includes border pixels.

In an alternative embodiment, foreground pixels groups that are within a region of the border or that have at least some of its pixels within a region of the border may be removed from the image. For example, foreground pixel groups with pixels that are within the border region as discussed in reference to the interest point detection, above.

8. Intersection Test of Foreground Pixels

Figure 13:
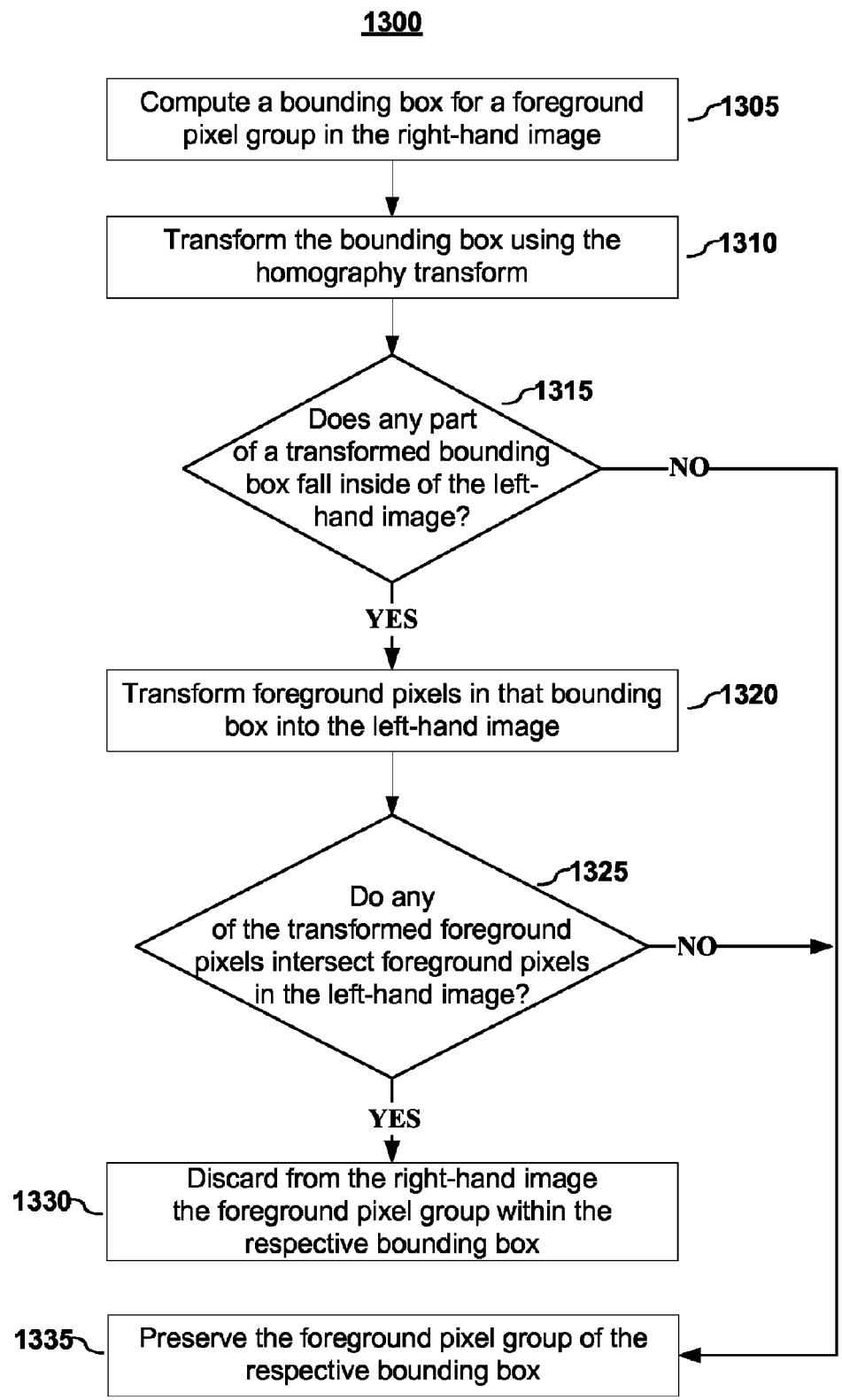
FIG. 13 depicts a method for testing the intersection of foreground pixels according to an embodiment of the invention.

Returning to FIG. 1, in an embodiment, an intersection test may be performed (135) to determine if any of foreground pixels should be pruned or discarded from one image because they appear in the other image. FIG. 13 depicts a method 1300 for testing the intersection of foreground pixels according to an embodiment of the invention.

Figure 12:
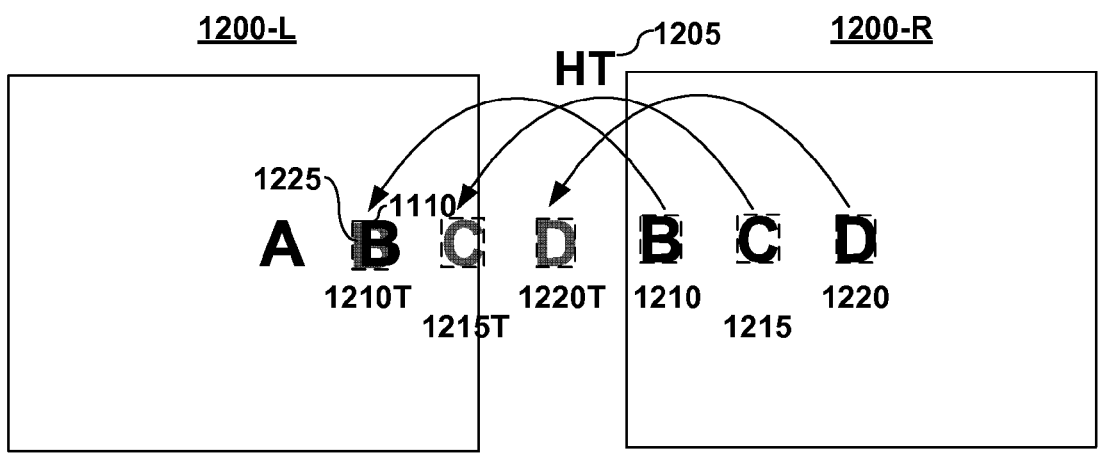
FIG. 12 illustrates examples of testing the intersection of foreground pixels according to an embodiment of the invention.

As depicted in FIG. 13, the method may commence by computing (1305) a bounding box for connected component group in one of the images, for example, the right-hand image. In an embodiment, the bounding box may be the tightest bounding box that bounds a foreground pixel group. In one embodiment, the bounding box may be the tightest bounding box with an axis aligned with an image axis. Using axis-aligned bounding boxes can speed the bounding box process as the number of possible bounding boxes for any given foreground pixel is reduced. FIG. 12 illustrates examples of testing the intersection of foreground pixels according to an embodiment of the invention. As shown in FIG. 12, a bounding box 1210, 1215, and 1220 has been formed around each of the foreground pixel groups, B, C, and D, respectively, in the right-hand image 1200-R.

In an embodiment, a bounding box, or alternatively, the corners of the bounding box, may be transformed (1310) using the homography transform, HT (1205), which was previously computed. The transformed bounding box may be examined to determine (1315) whether any portion of the bounding box resides within the other image, in this illustrative example, the left-hand image 1200-L. If no portion of the transformed bounding box resides within the other image, the foreground pixel group associated with that bounding box may be preserved (1335) for transforming into a composite image. For example, none of the transformed bounding box 1220T for the foreground pixel group for the letter "D" falls within the left-hand image 1200-L. Accordingly, in an embodiment, the foreground pixel group for the letter "D" is not discarded.

Note, however, that at least a portion of each of the transformed bounding boxes 1210T and 1215T for the foreground pixel groups "B" and "C," respectively, fall within the left-hand image 1200-L. Because at least a portion of the transformed bounding boxes falls within the other image, at least some of the foreground pixels may then be transformed (1320) using the homography transform, HT (1205). A check is performed to determine (1325) whether any of the transformed foreground pixels intersect, or fall into the same pixel position, as a foreground pixel in the left-hand image. If any transformed foreground pixels intersect foreground pixels in the other image, the foreground ground pixel group may be discarded (1330). The foreground pixel group may be discarded because the intersection of foreground pixels between the two image indicates that the pixel group is in both images, but it need only be in one image to form the composite image.

Consider, by way of illustration, the transformed foreground pixel group 1225 for the letter "B". Because at least some of the foreground pixels for the transformed pixel group 1225 intersect foreground pixels 1110 of the left-hand image, the foreground pixel group within the bounding box 1210 may be discarded. That is, the "B" in the right-hand image 1200-R may be removed because that "B" already exists within the left-hand image 1200-L.

Consider, by way of illustration, the transformed foreground pixel group for the letter "C". Note that none of the foreground pixels for the transformed pixel group intersect foreground pixels of the left-hand image, because the foreground pixel group for the letter "C" in the left-hand image was previously removed. Thus, there is not intersection of foreground pixels between the left-hand image and the transformed foreground pixels of the transformed bounding box 1215T. Because there is no intersection of foreground pixels, the foreground pixel group that forms the letter "C" in the right-hand image 1200-R may be preserved (1335).

9. Generating a Composite Image

Returning to the embodiment depicted in FIG. 1, the resultant images and foreground pixels may be formed (140) into a composite image. In an embodiment, the remaining foreground image pixels from one image may be transformed using the homography transform, HT, and joined with the foreground pixels of the other image. However, because the different images may present scale, rotation, and/or perspective variance, it may not be preferred to directly transform the foreground pixels from one image into the composite image. Accordingly, FIG. 14 depicts an alternative method 1400 for transforming pixels from one image into a composite image according to an embodiment of the invention.

Figure 14:
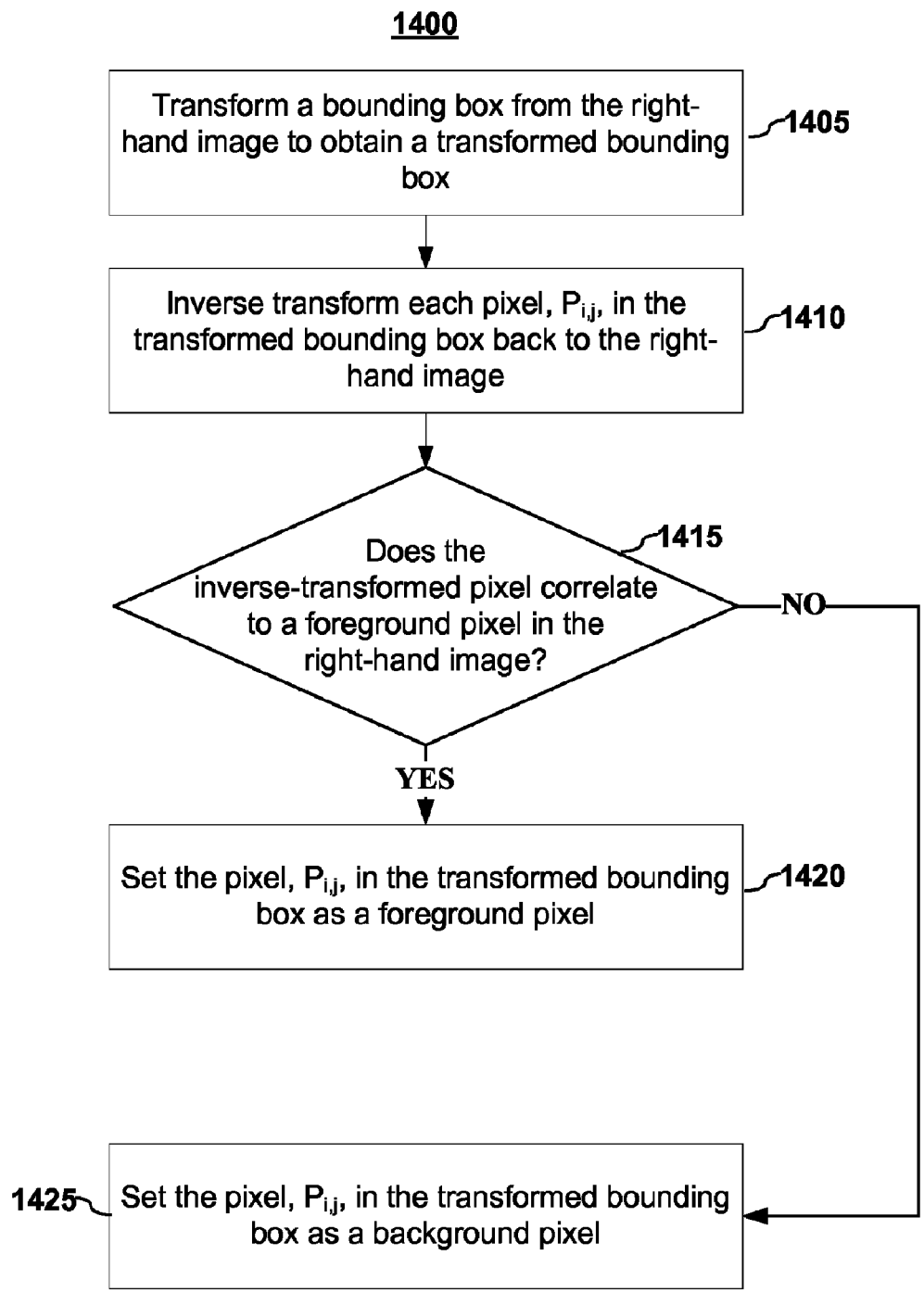
FIG. 14 depicts a method for forming a composite image by transforming pixels from one image to join them with another image according to an embodiment of the invention.

In the depicted embodiment in FIG. 14, a bounding box from one image (for example, the right-hand image) may be transformed (1405) to obtain a transformed bounding box. One skilled in the art shall recognize that this step may have previously been performed with respect to the method depicted in FIG. 13. Accordingly, this step may not need to be repeated.

Each pixel, $P_{i,j}$, in the transformed bounding box may be inverse transformed (1410) back to the source image (in this example, the right-hand image). And, a check may be made to determine (1415) whether the inverse-transformed pixel correlates to a foreground or a non-foreground pixel in the right-hand image. If the inverse-transformed pixel correlate to a foreground pixel in the right-hand image, the corresponding transformed pixel, $P_{i,j}$, may be set (1420) as a foreground pixel. If the inverse-transformed pixel correlates to a non-foreground pixel in the right-hand image, the corresponding transformed pixel, $P_{i,j}$, may be set (1425) as a background or non-foreground pixel.

Figure 15:
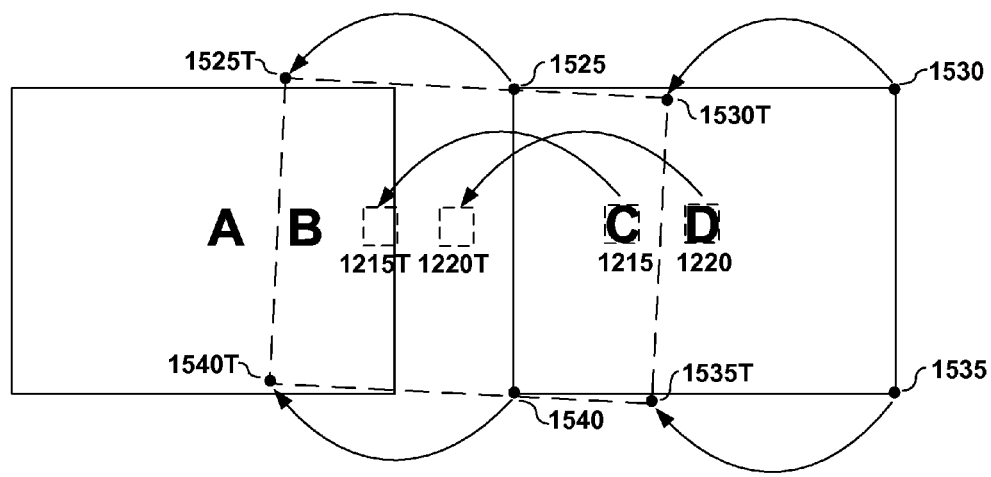
FIG. 15 illustrates transforming of pixels according to an embodiment of the invention.

FIG. 15 illustrates the transforming of pixels to form a composite image according to an embodiment of the invention. In an embodiment, bounding box 1215 and 1220 for the foreground pixel groups "C" and "D" (respectively) may be transformed to create transformed bounding boxes 1215T and 1220T. It should be noted that the foreground pixel group that formed the letter "B" and its associated bounding box are absent from the right-hand image 1505-R because of the intersection test, as discussed previously.

Figure 16:
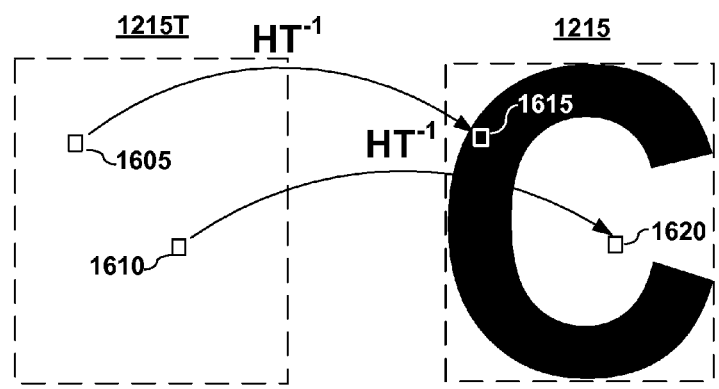
FIG. 16 illustrates a method for determining the type of pixel a transformed pixel should be according to an embodiment of the invention.

For the pixels within a transformed bounding box, FIG. 16 illustrates a method for determining the type of pixel a transformed pixel should be according to an embodiment of the invention. As illustrated in FIG. 16, a pixel within the transformed bounding box 1215T may be transformed back to the source bounding box 1215 using an inverse of the homography transform, $HT^{-1}$, in order to identify the type of pixel it should be. For example, the inverse transform of pixel 1605 correlates to a foreground pixel 1615 in the source image. Thus, pixel 1605 will be set as a foreground pixel. The inverse transform of pixel 1610 correlates to a non-foreground pixel 1620 in the source image. Thus, pixel 1610 will not be set as a foreground pixel.

Figure 17:
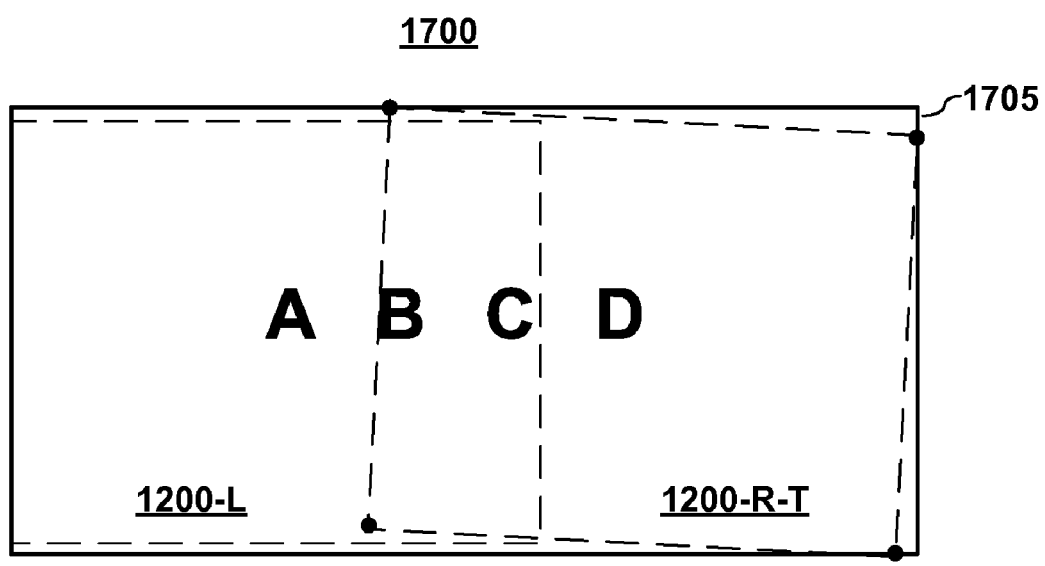
FIG. 17 depicts an example of two images that have been stitched together to form a composite image according to an embodiment of the invention.

As illustrated in FIG. 15, in an embodiment, each of the corners 1525-1540 of the one image may be transformed using the homography transform, HT, to form transformed corners 1525T-1540T in order to establish the boundaries of the transformed image. In one embodiment, given the boundaries of the composite image as set forth by the outmost boundaries of the two images, a single bounding box may be formed. For purpose of illustration, FIG. 17 depicts an example of a composite image 1700 comprising two images 1200-L and 1200-R-T that have been stitched together according to aspects of the present invention and a bounding box 1705 formed around the two images 1200-L and 1200-R-T according to an embodiment of the invention.

B. System Implementations

Figure 18:
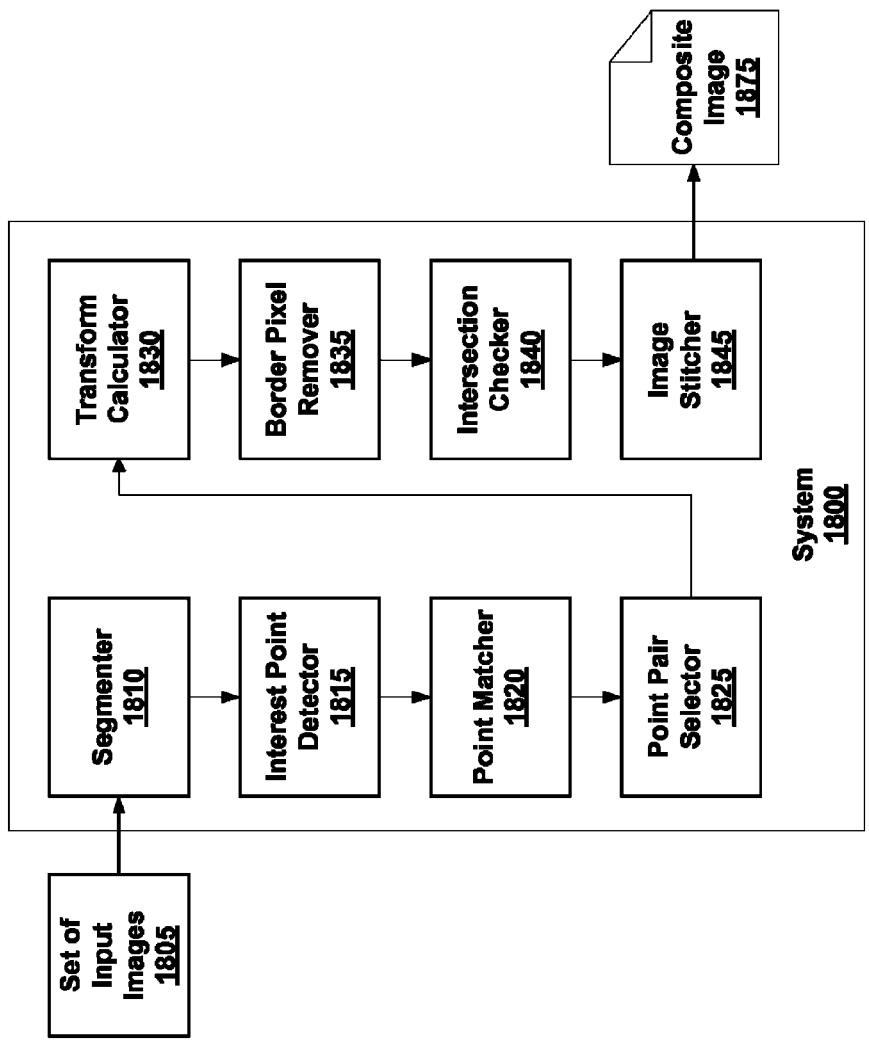
FIG. 18 depicts an image stitching system according to an embodiment of the invention.

FIG. 18 depicts an image stitching system 1800 according to an embodiment of the invention. Image stitching system 1800 comprises a segmenter 1810, an interest point detector 1815, point matcher 1820, point pair selector 1825, transform calculator 1830, border pixel remover 1835, intersection checker 1840, and image stitcher 1845.

In an embodiment, segmenter 1810 receives a plurality of input images 1805 and segments at least some of the plurality of images into images with foreground pixel regions and non-foreground pixel regions. As previously discussed, segmenter 1810 may perform one or more segmentation methods. No segmentation method is critical to the present invention; accordingly, segmenter 1810 may perform image segmentation using methods known in the art or using one or more the method previously incorporated herein by reference.

In an embodiment, the segmented images may be provided to an interest point detector 1815, which selects a set of interest points and their features from the images. In an embodiment, interest-point feature extraction of the images may be obtained using a multi-resolution interest-point detector. Examples of interest point detectors that may be used by the interest point detector 1815 include, but are not limited to, scale invariant feature transform (SIFT) and Harris corner detector.

In an embodiment, point matcher 1820 may use the extracted interested points to match point pairs between images. In an embodiment, the best-matched point pairs may be found using point features from both images. One skilled in the art shall recognize that the feature information of an interest point may form a vector for that interest point, and point matcher 1820 may match points by comparing the vector information.

In an embodiment, point pair selector 1825, identifies a set of dominant point pairs using the point pairs obtained from the point matcher 1820. In one embodiment, point pair selector 1825 may compute a distance histogram to identify the set of dominant point pairs.

In an embodiment, the dominant point pairs may be provided to a transform calculator 1830, which computes a transform between the matching point pairs. In an embodiment, transform calculator 1830 may perform a method according to that disclosed, with reference to FIG. 7 in order to obtain a transform.

In an embodiment, system 1800 may include a border pixel remover 1835 that removes pixels in an image that are on a border, or alternatively, that are within a region of a border of an image.

In an embodiment, intersection checker 1840, receives the image information and transform, and determines if duplicative information is contained within the images. If duplicative information is in the images to be stitched together, intersection checker 1840 may remove any duplicative foreground image pixels. In an embodiment, image checker 1840, may perform the method as disclosed with reference to FIG. 13.

In an embodiment, the output of intersection checker 1840, may be provided to the image stitcher 1845, which forms the images into a composite image 1875. In one embodiment, image stitcher 1845 may use the homography transform to transform the image and may, in an embodiment, perform the method for transforming the image foregrounding pixel according to that disclosed with reference to FIG. 14.

In one embodiment, system 1800 may perform multiple passes or iteratively for multiple images, wherein the outputted composite image may become part of the set of input images.

Also, in an embodiment, as discussed previously with respect to multiple pass transform calculating as discussed with reference to FIGS. 8-10. Although not shown in system 1800, the output of the transform calculator 1830 may be provided back to the interest point detector 1815 and the process may be repeated to better estimate the transform while using fewer pixel values.

Aspects of the present invention may be implemented in any device or system capable of processing the image data, including without limitation, a general-purpose computer and a specific computer intended for graphics processing. The present invention may also be implemented into other devices and systems, including without limitation, a digital camera, a printer, a scanner, a printer, a facsimile machine, a multimedia device, and any other device that processes, captures, transmits, or stores an image. Furthermore, within any of the devices, aspects of the present invention may be implemented in a wide variety of ways including software, hardware, firmware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

It shall be noted that embodiments of the present invention may further relate to computer products with a computer-readable medium that have computer code thereon for performing various computer-implemented operations. The media and computer code may be those specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

We claim:

1. A method for forming a composite image from a set of images, the method comprising:
    using one or more processors to execute at least in part the following operations:
    identifying one or more foreground pixel groups in a first image from the set of images and one or more foreground pixel groups in a second image from the set of images;
    identifying a set of interest points selected from the foreground pixel groups in the first image;
    forming a set of point pairs by finding a set of points selected from the foreground pixel groups of the second image that correlates to the set of interest points;
    forming a transform using at least some of the set of point pairs;
    responsive to a foreground pixel group residing on a boundary of the first image or the second image, removing the foreground pixel group;
    responsive to at least one foreground pixel of a transformed foreground pixel group from the second image, which transformed foreground pixel group is obtained using the transform, corresponding at a same pixel location in the first image to a foreground pixel in the first image, discarding the foreground pixel group of the second image;
    for a foreground pixel group of the second image that has not been discarded:
        transforming, according to the transform, a bounding box that bounds the foreground pixel group;
        performing an inverse transform of at least some of the pixels within the transformed bounding box; and
        responsive an inverse-transformed pixel corresponding to a foreground pixel in the second image, making the pixel from the transformed bounding box a foreground pixel.

2. The method of claim 1 wherein the step of identifying one or more foreground pixel groups in a first image from the set of images and one or more foreground pixel groups in a second image from the set of images comprises:
    using segmentation to convert each of the first and second images into a binary, segmented image.

3. The method of claim 1 wherein the step of forming a transform using at least some of the set of point pairs comprises:
    identifying a set of dominant point pairs; and
    using at least some of the set of dominant point pairs to form the transform.

4. The method of claim 3 wherein the step of identifying a set of dominant point pairs comprises:
    calculating a distance histogram representing the distance between point pairs from the set of point pairs;
    using the distance histogram to identify the set of dominant point pairs.

5. The method of claim 4 wherein the step of using the distance histogram to identify a set of dominant point pairs comprises:
    identifying a dominant bin of the distance histogram and the point pairs corresponding the dominant bin; and
    including the point pairs corresponding to the dominant bin as part of the set of dominant point pairs.

6. The method of claim 1 wherein a multi-resolution interest point detector is used to identifying the set of interest points.

7. The method of claim 1 wherein the steps of
    identifying a set of interest points selected from the foreground pixel groups in the first image;
    forming a set of point pairs by finding a set of points selected from the foreground pixel groups of the second image that correlates to the set of interest points; and
    forming a transform using at least some of the set of point pairs;
    comprise the steps of:
    identifying a first-pass set of interest points from the foreground pixel groups in a first portion of the first image;
    forming a first-pass set of point pairs by finding a first-pass set of points in the foreground pixel groups of the second image that correlates to the first-pass set of interest points;
    forming a first-pass transform using at least some of the first-pass set of point pairs;
    using the first-pass transform to identify an overlapping area between the first image and the second image;
    identifying a second-pass set of interest points from the foreground pixel groups in a set of regions selected from the overlapping area;
    forming a second-pass set of point pairs by finding a second-pass set of points in the foreground pixel groups of the second image that correlates to the second-pass set of interest points; and
    forming a transform using at least some of the second-pass set of point pairs.

8. A non-transitory device-readable medium comprising one or more sequences of instructions to direct an instruction-executing device to perform at least the steps of claim 1.

9. A system for forming a composite image from a set of images comprising:
    a segmenter, coupled to receive the set of images, that identifies one or more foreground pixel groups in a first image from the set of images and one or more foreground pixel groups in a second image from the set of images;
    an interest point detector, coupled to receive information from the segmenter, that identifies a set of interest points selected from the foreground pixel groups in the first image;
    a point matcher, coupled to receive information from the interest point detector, that forms a set of point pairs by finding a set of points selected from the foreground pixel groups of the second image that correlates to the set of interest points;
a point pair selector, coupled to receive information from the point matcher, that uses a distance histogram to select a set of dominant point pairs;
a transform calculator, coupled to receive information from the point pair selector, that forms a transform using at least some of the set of dominant point pairs;
a border pixel remover, coupled to receive information from the transform calculator, that, responsive to a foreground pixel group residing on a boundary of the first image or the second image, discards the foreground pixel group;
an intersection checker, coupled to receive information from the border pixel remover, that, responsive to at least one foreground pixel of a transformed foreground pixel group from the second image, which transformed foreground pixel group is obtained using the transform, corresponding at a same pixel location in the first image to a foreground pixel in the first image, discards the foreground pixel group of the second image; and
an image stitcher, coupled to receive information from the intersection checker, that uses the transform and at least some of the non-discarded foreground pixel groups to form a composite image.

10. The system of claim 9 wherein the image stitcher forms the composite image by performing the steps comprising:
for a foreground pixel group of the second image that has not been discarded:
transforming, according to the transform, a bounding box that bounds the foreground pixel group;
performing an inverse transform of at least some of the pixels within the transformed bounding box; and
responsive an inverse-transformed pixel corresponding to a foreground pixel in the second image, making the pixel from the transformed bounding box a foreground pixel.

11. The system of claim 9 wherein the transform calculator forms an overlap transform that is used to identify an overlapping area between the first image and the second image and forms a subsequent transform using point pairs selected from the overlapping area.

12. The system of claim 9 wherein the point pair selector performs the steps comprising:
calculating a distance histogram representing the distance between point pairs from the set of point pairs;
identifying a dominant bin of the distance histogram and the point pairs corresponding the dominant bin; and
including the point pairs corresponding to the dominant bin as part of the set of dominant point pairs.

13. A method for forming a composite image from a set of images, the method comprising:
using one or more processors to execute at least in part the following operations:
forming a transform between a first image and a second image;
responsive to a foreground pixel group residing on a boundary of the first image or the second image, removing the foreground pixel group;
responsive to at least a portion of a foreground pixel group transformed, using the transform, from the second image intersecting at least a portion of a foreground pixel group in the first image, removing the foreground pixel group from one of the first or the second images;
for a foreground pixel group of the second image that has not been discarded:
transforming, according to the transform, a bounding box that bounds the foreground pixel group;
performing an inverse transform of at least some of the pixels within the transformed bounding box; and
responsive an inverse-transformed pixel corresponding to a foreground pixel in the second image, making the pixel from the transformed bounding box in the first image a foreground pixel.

14. The method of claim 13 wherein the step of forming a transform between a first image and a second image comprises:
identifying a set of interest points selected from the foreground pixel groups in the first image;
forming a set of point pairs by finding a set of points selected from the foreground pixel groups of the second image that correlates to the set of interest points; and
forming a transform using at least some of the set of point pairs.

15. The method of claim 14 further comprising:
identifying a set of dominant point pairs; and
using the set of dominant point pairs to form the transform.

16. The method of claim 13 wherein the step of forming a transform between a first image and a second image comprises:
generating an overlap transform using a portion of at least one of the first and the second images;
using the overlap transform to identify an overlapping area between the first image and the second image;
identifying a set of interest points from the foreground pixel groups in a set of regions selected from the overlapping area;
forming a set of point pairs by finding a set of points in a set of regions selected from the overlapping area of the second image that correlates to the set of interest points; and
forming a transform using at least some of the set of point pairs.

17. The method of claim 16 wherein the step of forming a transform using at least some of the set of point pairs comprises the steps of:
[a] forming a transform using at least some of the set of point pairs;
[b] for at least some of the points pairs that were used to form the transform, wherein each point pair contains a first point from the first image and a second point from the second image, using the transform to transform the second point from a point pair to obtain a transformed point;
[c] computing an error value between the transformed point and the first point;
[d] responsive to an error value exceeding an error threshold value, discarding the point pair from the set of point pairs and responsive to the number of point pairs in the set of point pairs exceeding a threshold number, iterating by returning to step [a]; and
[e] responsive to no point pairs being discarded, using the transform to form a composite image of the first and second images.

18. The method of claim 17 further comprising:
responsive to the number of point pairs in the set of point pairs not exceeding a threshold number, reorienting the first and second images and repeating the processes of forming a transform.

19. The method of claim 18 further comprising:
responsive to not forming a transform between the first and second image, selecting a different second image from the set of images and forming a transform.

20. A non-transitory device-readable medium comprising one or more sequences of instructions to direct an instruction-executing device to perform at least the steps of claim 13.

* * * * *